US012018830B2

(12) United States Patent
Li et al.

(10) Patent No.: US 12,018,830 B2
(45) Date of Patent: Jun. 25, 2024

(54) WEATHER-RESISTANT LED ASSEMBLY

(71) Applicant: SCT LTD., Grand Cayman (KY)

(72) Inventors: Eric Li, Milpitas, CA (US); Yutao Chen, Guangdong (CN); XinQiang Lu, Guangdong (CN); Yongzhi Wen, Guangdong (CN); KuanChih Kuo, Hsinchu (TW); Kuan-Hsiueng Wang, Hsinchu (TW); Sheng-Han Chen, Hsinchu (TW); Cing Lai, Hsinchu (TW); Yi Ling Wen, Hsinchu (TW)

(73) Assignee: SCT LTD., Grand Cayman (KY)

( * ) Notice: Subject to any disclaimer, the term of this patent is extended or adjusted under 35 U.S.C. 154(b) by 0 days.

(21) Appl. No.: 18/326,810

(22) Filed: May 31, 2023

(65) Prior Publication Data

US 2023/0392780 A1 Dec. 7, 2023

Related U.S. Application Data

(60) Provisional application No. 63/365,699, filed on Jun. 1, 2022.

(51) Int. Cl.

| | |
|---|---|
| ***F21V 31/00*** | (2006.01) |
| ***F21V 19/00*** | (2006.01) |
| ***F21V 23/06*** | (2006.01) |
| *F21Y 115/10* | (2016.01) |

(52) U.S. Cl.

CPC ........ *F21V 31/005* (2013.01); *F21V 19/0015* (2013.01); *F21V 23/06* (2013.01); *F21Y 2115/10* (2016.08)

(58) Field of Classification Search

CPC ............................... F21V 31/005; F21V 23/06

See application file for complete search history.

(56) References Cited

U.S. PATENT DOCUMENTS

| | | | | |
|---|---|---|---|---|
| 8,154,864 | B1 * | 4/2012 | Nearman | G09F 9/3026 361/679.01 |
| 11,036,455 | B2 * | 6/2021 | Kim | G06F 3/1446 |
| 2009/0032825 | A1 * | 2/2009 | Mo | G09F 13/22 257/E33.001 |
| 2019/0108784 | A1 * | 4/2019 | Foster | G09G 3/32 |
| 2020/0211446 | A1 * | 7/2020 | Mays | G09G 3/32 |
| 2021/0063009 | A1 * | 3/2021 | Zhang | F21V 29/83 |
| 2022/0104382 | A1 * | 3/2022 | Dulieu | G09F 9/33 |
| 2022/0408577 | A1 * | 12/2022 | Zhang | H05K 5/0226 |

* cited by examiner

*Primary Examiner* — Christopher E Dunay

(74) *Attorney, Agent, or Firm* — NKL Law; Allen Xue

(57) ABSTRACT

Weather-resistant light emitting diode (LED) assemblies, which prevent water and moisture from entering the LED assemblies, which may be integrated to form a display, so that images may be displayed on the display are provided. A waterproof light emitting diode (LED) assembly including an LED tile including one or more LED boards; and a power box, wherein each LED board includes an array of LEDs, and the LED tile and the power box are connected through a plurality of waterproof connector assemblies is provided. Each waterproof connector assembly comprises a waterproof connector plug and waterproof connector socket having an O-ring, wherein the waterproof connector having the O-ring cooperatively interfacing with the waterproof connector plug seals the waterproof connector assembly. A waterproof LED panel including a plurality of waterproof LED assemblies mounted on a LED panel frame is also provided.

19 Claims, 8 Drawing Sheets

WEATHER-RESISTANT LED ASSEMBLY

TECHNICAL FIELD

The present disclosure relates to weather-resistant light emitting diode (LED) assemblies, which prevent water and moisture from entering the LED assemblies, which may be integrated to form a display, so that images may be displayed on the display.

BACKGROUND

Outdoor LED displays are subject to a variety of weather conditions, among which water and moisture are particularly troublesome for electronic components in the LED display system. Accordingly, water/moisture proof LED assemblies are of great importance for LED outdoor applications. Traditional designs often employ cabinets separated from the LED display, which house electronics such as power supply, receivers that receive video signals, and transmitters that transmit (send) video signals to the LED display. Receivers and transmitters (senders) contain printed circuit boards (PCBs) and other electronic components as well as wires (wirings).

Accordingly, there is a need for apparatuses to prevent water and moisture from entering the LED assemblies to prevent damage to the LED assemblies, so that images may be displayed on a display.

SUMMARY

In one or more embodiments, there is provided waterproof LED assemblies that have distributed power boxes associated with LED arrays to form LED assemblies (LED modules). Each power box is hermetically sealed while the LED arrays include hermetically sealed boards. The power box and the LED boards may be connected via a waterproof connector assembly.

In one or more embodiments, there is provided a waterproof light emitting diode (LED) assembly including an LED tile including one or more LED boards; and a power box, wherein each LED board includes an array of LEDs, and the LED tile and the power box are connected through one or more waterproof connector assemblies.

In one or more embodiments, each waterproof connector assembly may include a waterproof connector socket and waterproof connector plug, wherein the waterproof connector socket receives the waterproof connector plug.

In one or more embodiments, each waterproof connector assembly may include a waterproof connector plug and waterproof connector socket having an O-ring, wherein the waterproof connector having the O-ring cooperatively interfacing with the waterproof connector plug seals the waterproof connector assembly.

In one or more embodiments, each LED board in the LED tile may have one waterproof connector plug, and each power box has one waterproof socket.

In one or more embodiments, the power box may include a power supply.

In one or more embodiments, a number of LED boards in the LED tile may equal a number of the plurality of waterproof connector sockets; and each LED board in the LED tile may have one of the plurality of waterproof connector plugs.

In one or more embodiments, a waterproof light emitting diode (LED) assembly may further include a structural support having openings, wherein each opening receives one of the plurality of waterproof connector assemblies, and wherein the support is positioned between the LED tile and the power box.

In one or more embodiments, the power box may have a front cover including a plurality of alignment steps forming a grid having a surface; a structural support may be positioned between the LED tile and the power box; and the surface of the grid may be positioned in close contact with the structural support for alignment of the LED tile and the power box during assembly of the waterproof LED assembly.

In one or more embodiments, each power box may be hermetically sealed.

In one or more embodiments, each power box may include a power supply.

In one or more embodiments, the power box may include a back cover including a waterproof video input connector to receive input video signals for the waterproof LED assembly.

In one or more embodiments, the power box may include a back cover including a waterproof video output connector to output video signals from the waterproof LED assembly.

In one or more embodiments, the power box may include a back cover including a waterproof power input connector to receive power for the waterproof LED assembly.

In one or more embodiments, the power box may include a back cover including a waterproof power output connector to output power from the waterproof LED assembly.

In one or more embodiments, each LED board may be hermetically sealed.

In one or more embodiments, a waterproof LED assembly may further include a structural support, wherein the support is positioned between the LED boards forming the LED tile and the power box, and wherein each LED board has magnets to couple the structural support to the LED boards of the LED tile.

In one or more embodiments, each LED board may include a plurality of driver chips, wherein each driver chip may receive a driving signal from the power box and may drive corresponding LEDs of the waterproof LED assembly in response to the driving signal.

In one or more embodiments, there is provided a waterproof LED panel including a plurality of waterproof LED assemblies of one or more embodiments mounted on a LED panel frame.

In one or more embodiments, the LED panel frame defines a plurality of windows, each window receives one or more plates, and each of the one or more plates has one or more amongst the plurality of waterproof LED assemblies affixed thereto.

In one or more embodiments, each of the one or more plates has a plurality of openings, each waterproof connector assembly extends through one of the plurality of openings on the plate.

In one or more embodiments, there is a method for constructing the waterproof LED panel of one or more embodiments, which may include constructing a LED panel frame having a plurality of windows, mounting one or more plates in each of the plurality of windows; and mounting one or more of the waterproof LED assemblies on each of the one or more plates.

In one or more embodiments, there is provided a method further including connecting the power box in each of the waterproof LED assembly with an external power source and an external signal source.

BRIEF DESCRIPTION OF THE DRAWINGS

The teachings of the present invention can be readily understood by considering the following detailed description in conjunction with the accompanying drawings.

DETAILED DESCRIPTION

Figure 1:
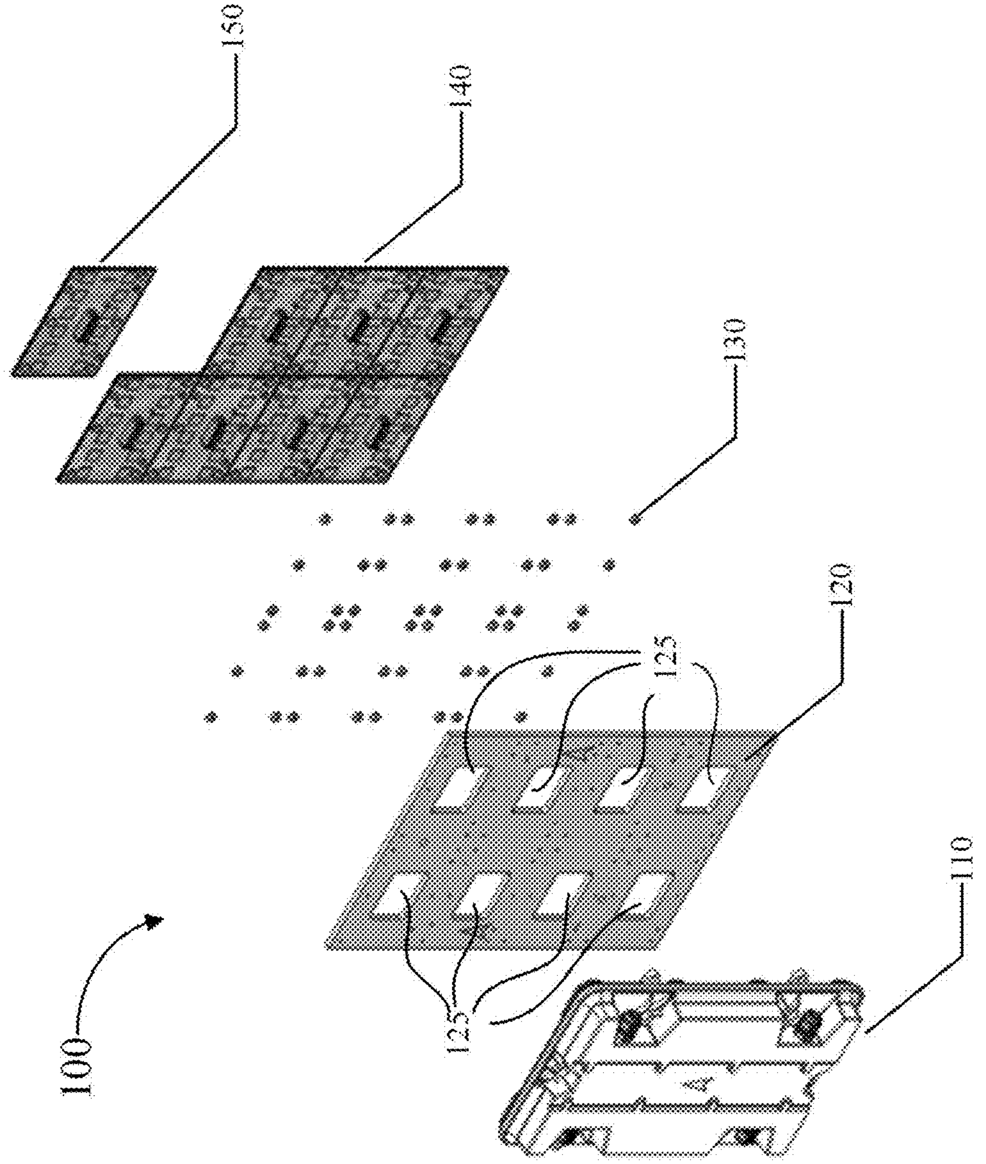
FIG. 1 is an exploded view of a weather-resistant (waterproof) LED assembly (LED module) in an exemplary embodiment.

Reference will now be made in detail to embodiments of the present disclosure, examples of which are illustrated in the accompanying drawings. It is noted that wherever practicable, similar or like reference numbers may be used in the drawings and may indicate similar or like elements.

The drawings depict embodiments of the present disclosure for purposes of illustration only. One skilled in the art would readily recognize from the following description that alternative embodiments exist without departing from the general principles of the disclosure.

In embodiments, the term "water and moisture proof" may be used interchangeably with the terms "waterproof" and "weather-resistant," which generally means having structural features that enable complete or partial prevention from water or moisture penetration.

FIG. 1 is an exploded view of a weather-resistant (waterproof) LED assembly (LED module) 100 in an exemplary embodiment. The waterproof LED assembly 100 includes a power box 110, an aluminum plate 120 having openings (holes) 125, one or more magnets 130, and an LED tile 140, which integrates and/or includes a plurality of LED boards 150. In an exemplary embodiment in FIG. 1, the LED tile 140 includes eight LED boards 150. Each LED board 150 has one or more arrays of LEDs.

Figure 2C:
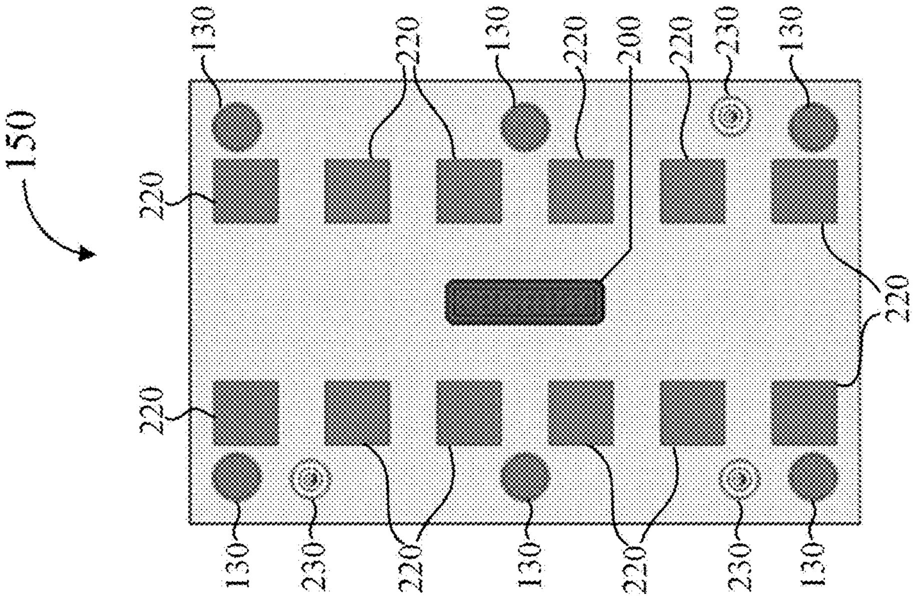
FIG. 2C is a rear view of an LED board in an exemplary embodiment
Figure 2B:
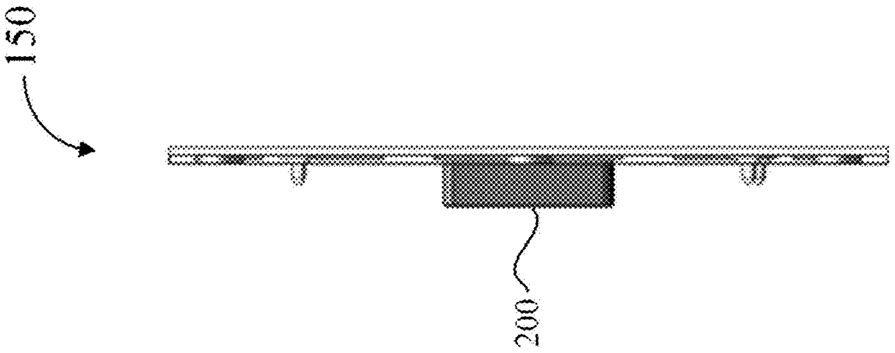
FIG. 2B is a side view of an LED board in an exemplary embodiment.
Figure 2A:
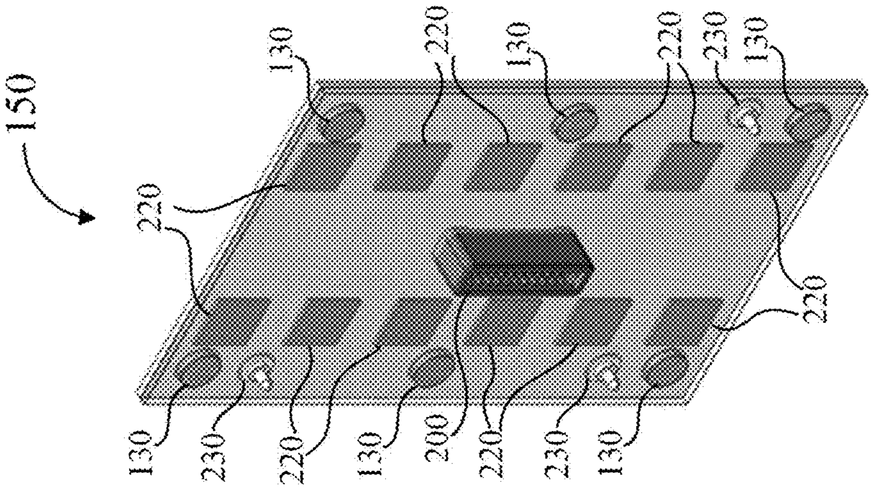
FIG. 2A is a perspective view of an LED board in an exemplary embodiment.

FIG. 2A is a perspective view of an LED board 150 of LED tile 140 in an exemplary embodiment, FIG. 2B is side view of the LED board 150 of LED tile 140 in an exemplary embodiment, and FIG. 2C is a rear view of the LED board 150 of LED tile 140 in an exemplary embodiment. As shown in one or more of FIGS. 2A-2C, the LED board 150 has a waterproof connector plug 200, an LED board aluminum plate 210, twelve LED driver chips 220, three alignment pins 230, and six magnets 130. In this exemplary embodiment, each LED board 150 has twelve LED arrays disposed on the front side of the LED board (not shown), each driven by one of the twelve LED chips. Although one or more of FIGS. 2A-2C show the LED board 150 with twelve LED driver chips 220, this is only one example. The LED board 150 may include any number of LED driver chips 220. The LED driver chips 220 may be the same or different. Each driver chip 220 receives a driving signal from the power box 110 and drives corresponding LEDs of a corresponding LED array in accordance with the driving signal (in response to the driving signal). Although three alignment pins 230 are shown in one or more of FIGS. 2A-2C, two or more alignment pins 230 may be used for alignment. The magnets 130 may be mounted on the LED board aluminum plate 210 as shown in one or more of FIGS. 2A-2C. Although one or more of FIGS. 2A-2C show six magnets 130, this is only one example. The LED board 150 may include any number of magnets 130.

Figure 3:
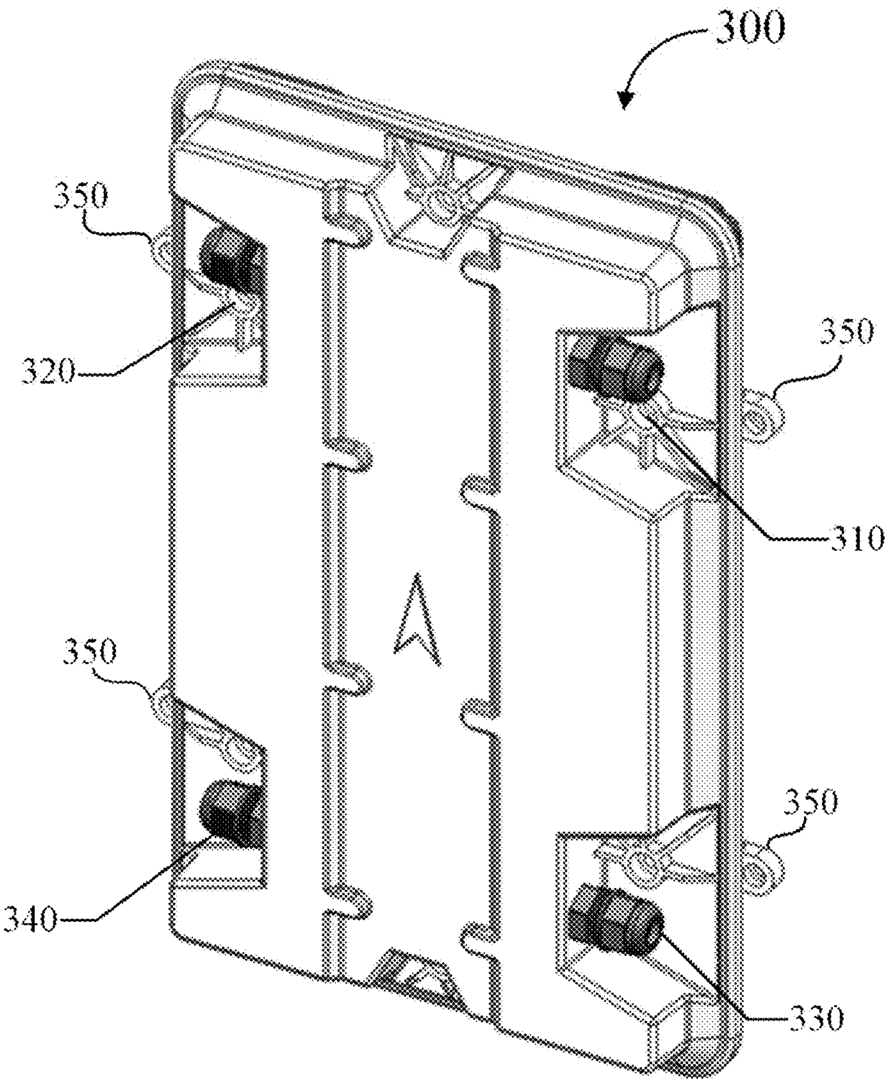
FIG. 3 shows a back cover of a power box in an exemplary embodiment.
Figure 4:
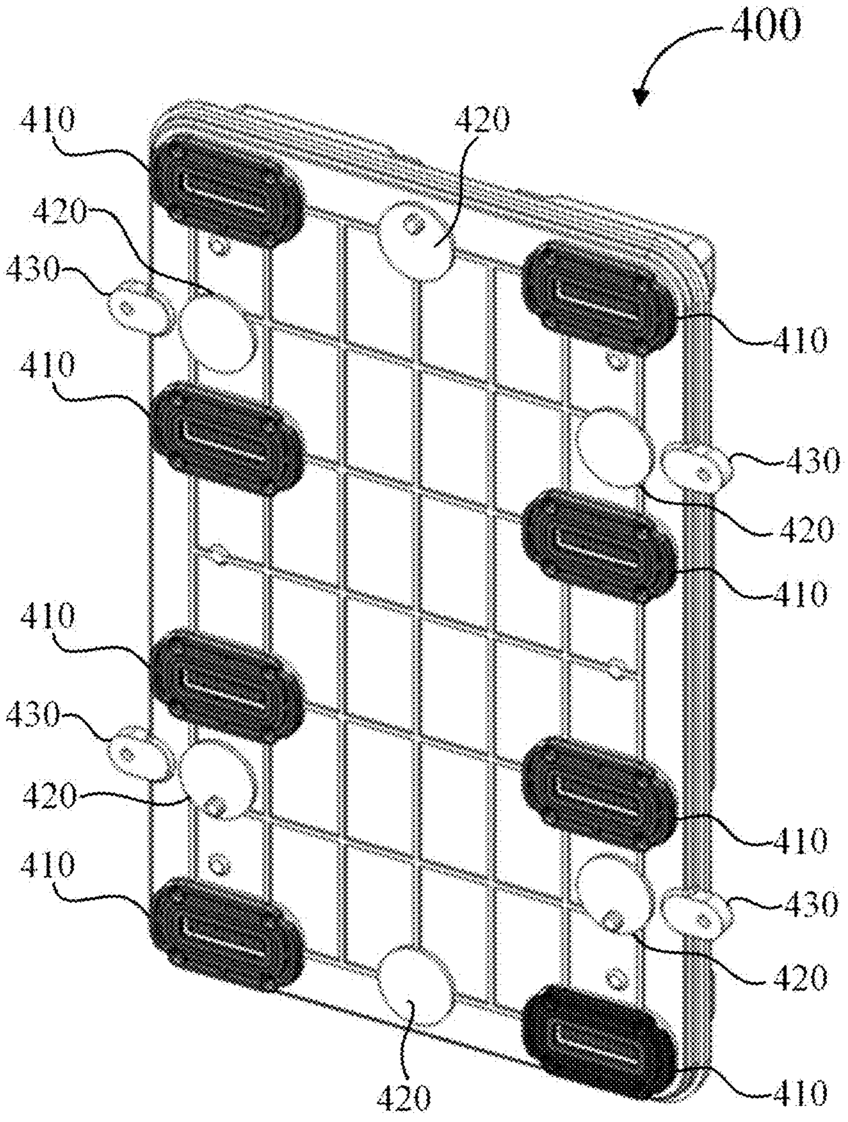
FIG. 4 shows a front cover of a power box in an exemplary embodiment.

FIG. 3 shows a back cover (rear cover) 300 of the power box 110 in an exemplary embodiment, and FIG. 4 shows a front cover 400 of the power box 110 in an exemplary embodiment. The back cover 300 of FIG. 3 includes a waterproof video input connector 310, a waterproof video output connector 320, a waterproof power input connector 330, a waterproof power output connector 340, and four fixtures 350 configured to receive corresponding screws through openings (holes or screw holes) in fixtures 350. The waterproof video input connector 310 provides a video input port to power box 110. The waterproof video output connector 320 provides a video output port to power box 110. The waterproof power input connector 330 provides a power input port to power box 110. The waterproof power output connector 340 provides a power output port to power box 110. The number of fixtures 350 may be any number.

Referring to FIG. 4, the front cover 400 of the power box 110 faces the LED tile 140 through openings 125 of the aluminum plate 120 when the waterproof LED assembly 100 is assembled. In this exemplary embodiment, the front cover 400 of power box 110 includes eight waterproof connector sockets 410 as well as six alignment steps 420 and four fixtures 430 configured to receive corresponding screws through openings (holes or screw holes) in fixtures 430. The number of waterproof connector sockets 410 corresponds to the number of LED boards 150 integrated in the LED tile 140 where each LED board 150 has a waterproof connector plug 200. In addition, screws (not shown) may be inserted through fixtures 350 of the back cover 300 of the power box 110 and fixtures 430 of the front cover 400 of the power box 110. Moreover, the alignment steps 420 on the front cover 400 of power box 110 form a grid. The surface of the grid is in close contact with the aluminum plate 120 when the waterproof LED assembly 100 is assembled. The number of fixtures 430 may be any number, and the number of alignment steps 420 may be any number. Preferably the number of fixtures 430 of the front cover 400 should be equal to the number of fixtures 350 of the back cover 300.

Figure 5:
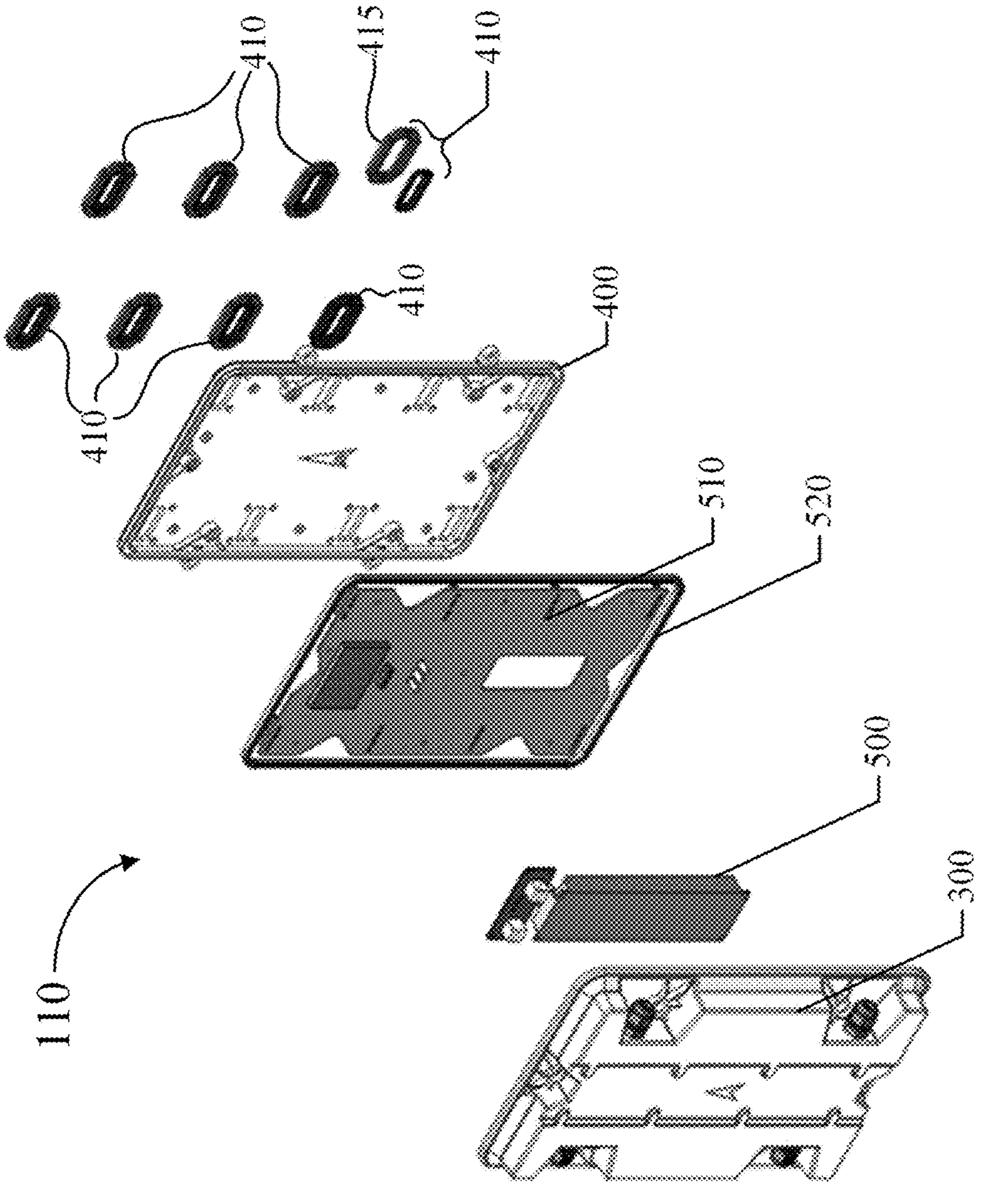
FIG. 5 is an exploded view of a power box in an exemplary embodiment.

FIG. 5 is an exploded view of a power box 100 including back cover 300 and front cover 400 in an exemplary embodiment. Each waterproof connector socket 410 may include an O-ring 415. The exploded view of the power box 110 in FIG. 5 further shows a power supply 500 and HUB board 510 that are sealed by a sealing ring 520 inside the power box 110 when assembled. The HUB board 510 is a PCB board. It hosts the power supply 500, a receiver card (not shown), connector sockets 410, etc. As such, the power box 100 supplies power as well as signals to the LED boards 150.

Referring to FIGS. 1-5, the LED board 150 in FIG. 2 includes a waterproof connector plug 200 which is configured to be connected to one of the waterproof connector sockets 410 of FIG. 4 during assembly of the waterproof LED assembly 100. In the embodiments shown in FIGS.

1-5, eight waterproof connector plugs 200 are configured to connect with eight waterproof connector sockets 410, respectively, where each waterproof connector socket 410 has an O-ring 415. The connection of a waterproof connector plug 200 and a waterproof connection socket 410 forms a waterproof connector assembly (waterproof connector). Each waterproof connector socket 410 has an O-ring 415 that, cooperatively interfacing with the waterproof connector plug 200, seals the waterproof connector assembly (waterproof connector) when assembled. Each LED Board 150 is configured to receive power and input signals from the power box 110 through the waterproof connector assembly.

Referring to FIGS. 1-5, the aluminum plate 120 has eight openings 125. When the waterproof LED assembly (LED module) 100 is assembled, the aluminum plate 120 is sandwiched between the power box 100 and the LED tile 140. Each of the eight waterproof connector plugs 200 extends through one of the openings 125 of the aluminum plate 120 and plugs into a waterproof connector socket 410 on the front? cover 400 the power box 110. The aluminum plate 120 provides structural support and provides structures for alignment of the LED tile 140 with the aluminum plate 120. The aluminum plate 120 (structural support) has a plurality alignment holes that receive alignment pins 230 from LED boards 150 integrated into the LED tile 140, so that the aluminum plate 120 aligned with the LED tile 140. Although FIGS. 1-5 show an LED tile 140 with eight LED boards 150, this is only an example. The LED tile 140 may have more than eight LED boards 150 or less than eight LED boards 150. Preferably, the number of LED boards 150 corresponds to the number of openings 125 in the aluminum plate 120 and the number of waterproof connector sockets 410.

Referring to FIGS. 1-5, the LED tile is already sealed and/or waterproofed before assembly into the waterproof LED assembly 100. In addition, the power box 110 has also been sealed and/or waterproofed before assembly into the waterproof LED assembly 100. The sealing mechanism and/or waterproofing mechanism of the power box 110 and the LED tile 140 can be any know suitable sealing mechanism. Moreover, as indicated above, each waterproof connector socket 410 has an O-ring 415 that, cooperatively with the waterproof connector plug 200, seals the waterproof connector assembly (waterproof connector) when assembled. Accordingly, all waterproof connector assemblies are waterproof and/or sealed. Accordingly, the waterproof LED assembly 100 is waterproof and weather resistant.

The power box 110 and the LED tile 140 can be connected without the aluminum plate 120 and remain waterproof. Further, the aluminum plate 120 or any structural support may be sealed together with the LED tile 140.

Figure 6:
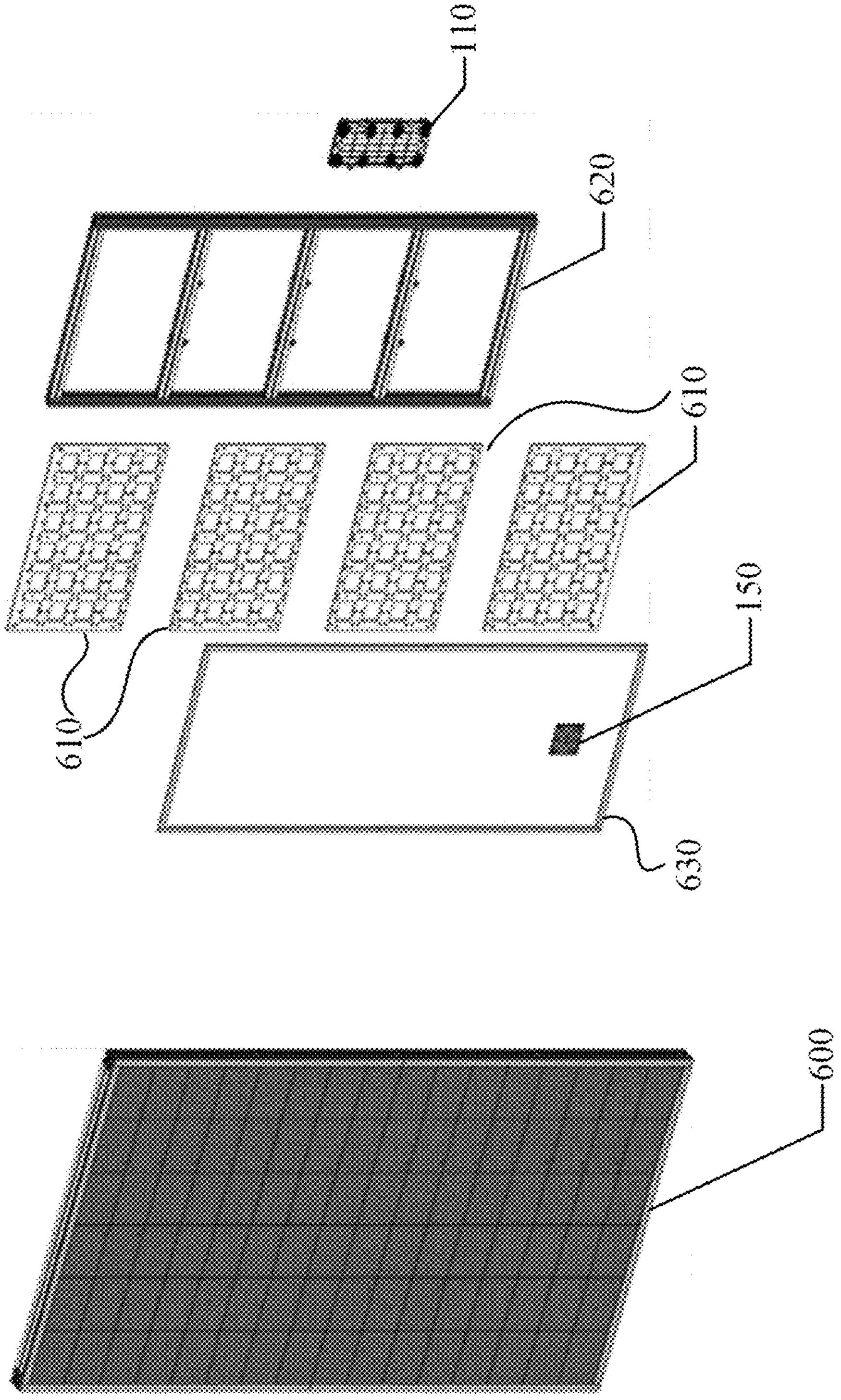
FIG. 6 is an exploded view of a waterproof LED panel in an exemplary embodiment.

FIG. 6 is an exploded view of a waterproof LED panel 600 in an exemplary embodiment. The waterproof LED panel 600 includes a plurality of waterproof LED assemblies (LED modules) 100. In an exemplary embodiment in FIG. 6, there are three waterproof LED assemblies 100, with each waterproof LED assembly 100 including eight LED boards 150 forming one LED tile 140, for each aluminum LED panel plate 610. Each LED board 150 is hermetically sealed. In an exemplary embodiment in FIG. 6, there are four aluminum LED panel plates 610 mounted on aluminum frame 620, which are sealed by a sealant 630, and which are integrated to form an LED array. In this embodiment, the sealant 630 is a sealing ring. In other embodiments, the sealant can be epoxy resin that glues the back and front cover the power box together.

Accordingly, an exemplary embodiment in FIG. 6 shows a waterproof LED panel 600 including twelve waterproof LED assemblies such as twelve of the waterproof LED assemblies 100 shown in FIG. 1. Although FIG. 6 shows only one power box 110, it is understood that each of the twelve waterproof LED assemblies 100 includes a power box 110. Each power box 110 is hermetically sealed. Although the waterproof LED panel 600 of FIG. 6 includes twelve waterproof LED assemblies 100, the waterproof LED panel 600 may include any number of waterproof LED assemblies 100.

Figure 7A:
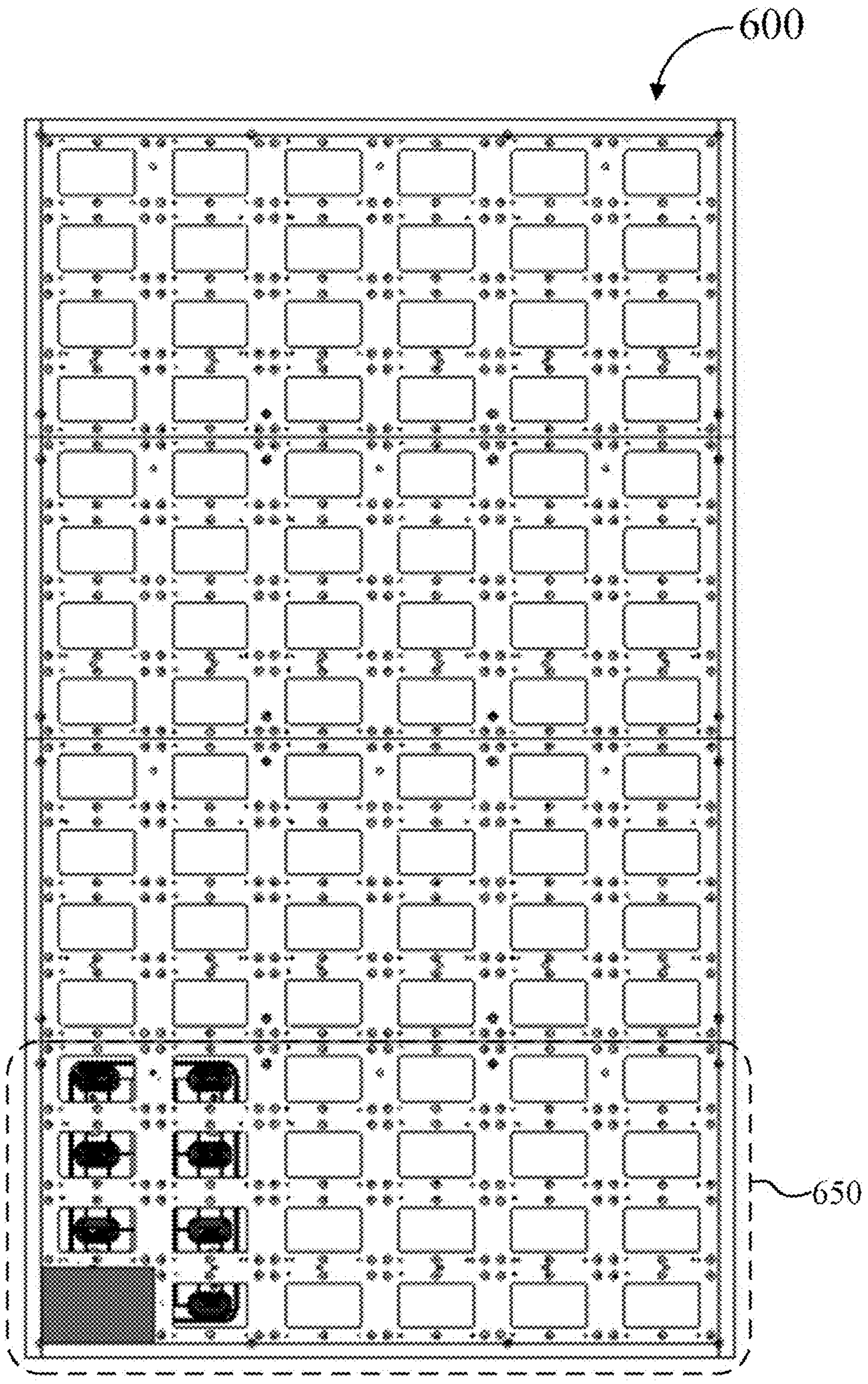
FIG. 7A shows a waterproof LED panel without a power box in an exemplary embodiment.
Figure 7B:
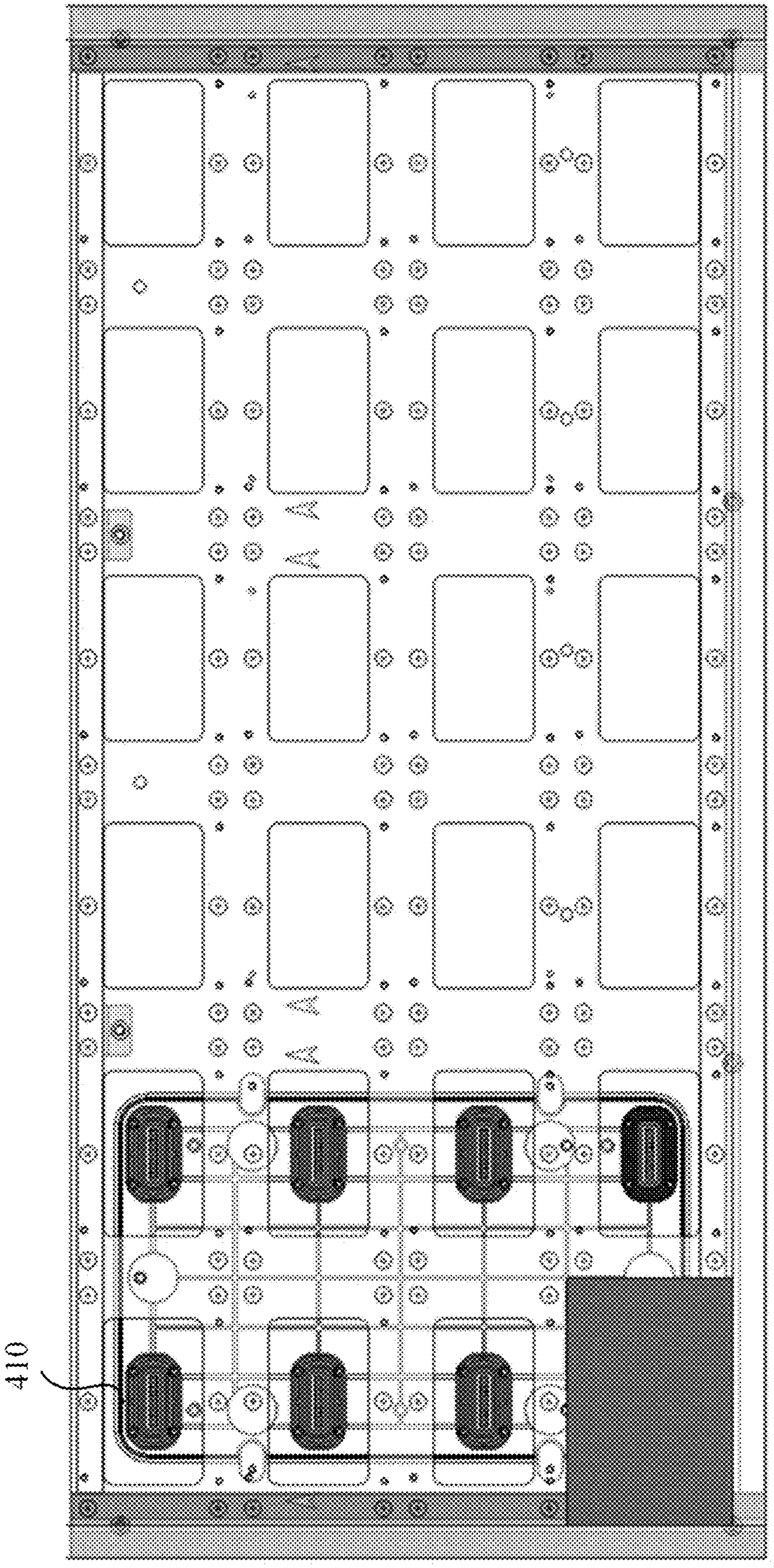
FIG. 7B shows a bottom section of the waterproof LED panel of FIG. 7A without the power box.

FIG. 7A shows details of the spatial relationship between the power box 110 and the aluminum plate 610 in an LED panel 600 in an exemplary embodiment, and FIG. 7B shows an enlarged bottom section of FIG. 7A. Although eight LED boards 150 are integrated into an LED tile 140 and connected to one power box 110, FIG. 7A shows the front of one LED boards corresponds to one of the eight waterproof connector sockets on the power box 110. It further exposes seven of eight waterproof connector sockets 410 on the power box 110 protruding through the openings in the aluminum plate. In an exemplary embodiment in FIG. 7A, the LED board 150 employs one waterproof connector plug 200 that connects with one of the eight waterproof connector sockets 410 in the power box 110 for form a waterproof connection assembly (waterproof connector).

In an exemplary method of assembling a waterproof LED panel 600, four aluminum LED panel plates 610 are mounted on the aluminum LED panel frame 620, and sealed with sealant 630. An LED tile 140 and associated power box 110 is mounted on the aluminum LED panel plates 610, connected and fastened to the aluminum panel frame 620. Then, the next LED tile 140 and associated power box 110 are mounted, until all the LED tiles 140 and power boxes 110 are mounted to form a complete waterproof LED panel 600, which includes a plurality of waterproof LED assemblies 100.

Numerous variations of the illustrated example are within the scope of this disclosure. For example, rather than a unitary LED tile that integrates eight LED boards as one unit, the LED tile may have only one board. In other words, individual LED board can be one sealed unit that is independent from other LED boards. The size of the LED board or the LED tile may vary as practical and suitable. Instead of using magnets, other known fasteners can be used to fasten the LED tile to the aluminum plate or the power box. One power box may be connected to one LED tile or a plurality of LED tiles.

In another exemplary embodiment, each LED board 150 includes a waterproof connector socket with O-ring and the front cover of each power box may include a waterproof connector plug. This waterproof connector socket with O-ring and waterproof connector plug may form a waterproof connector assembly (waterproof connector).

While embodiments of this disclosure have been shown and described, modifications can be made by one skilled in the art without departing from the spirit or teaching of this invention. The embodiments described herein are exemplary only and are not limiting. Many variations and modifications of methods, systems and apparatuses are possible and are within the scope of the invention. Accordingly, the scope of protection is not limited to the embodiments described herein, but is only limited by the claims. The scope of the claims shall include all equivalents of the subject matter of the claims.

What is claimed is:

1. A waterproof light emitting diode (LED) assembly comprising:

an LED tile including one or more LED boards; and a power box, wherein each LED board comprises an array of LEDs, and the LED tile and the power box are connected through one or more waterproof connector assemblies, wherein the power box comprises a front cover and a back cover that form a housing and the housing has disposed therein a power supply and a receiver card, and the power box is hermetically sealed.

2. The waterproof LED assembly of claim 1, wherein each waterproof connector assembly comprises a waterproof connector socket and waterproof connector plug, wherein the waterproof connector socket receives the waterproof connector plug.

3. The waterproof LED assembly of claim 2, wherein:

a number of LED boards in the LED tile equals a number of the plurality of waterproof connector sockets; and each LED board in the LED tile has one of the plurality of waterproof connector plugs.

4. The waterproof LED assembly of claim 1, wherein each waterproof connector assembly comprises a waterproof connector plug and waterproof connector socket having an O-ring, wherein the waterproof connector having the O-ring cooperatively interfacing with the waterproof connector plug seals the waterproof connector assembly.

5. The waterproof LED assembly of claim 4, wherein each LED board in the LED tile has one waterproof connector plug, and each power box has one waterproof socket configured to receive the waterproof connector plug.

6. The waterproof LED assembly of claim 1, further comprising a structural support having openings, wherein each opening receives one of the plurality of waterproof connector assemblies, and wherein the support is positioned between the LED tile and the power box.

7. The waterproof LED assembly of claim 1, wherein:

the front cover of the power box includes a plurality of alignment steps forming a grid having a surface;

a structural support is positioned between the LED tile and the power box; and the surface of the grid is positioned in close contact with the structural support for alignment of the LED tile and the power box during assembly of the waterproof LED assembly.

8. The waterproof LED assembly of claim 1, wherein the back cover of the power box includes a waterproof video input connector configured to receive input video signals from an external signal source.

9. The waterproof LED assembly of claim 1, wherein the back cover of the power box includes a waterproof video output connector configured to output video signals from the waterproof LED assembly.

10. The waterproof LED assembly of claim 1, wherein the back cover of the power box includes a waterproof power input connector configured to receive power from an external power source.

11. The waterproof LED assembly of claim 1, wherein the back cover of the power box includes a waterproof power output connector configured to output power from the waterproof LED assembly.

12. The waterproof LED assembly of claim 1, wherein each LED board is hermetically sealed.

13. The waterproof LED assembly of claim 1, further comprising a structural support, wherein the structural support is positioned between the LED boards forming the LED tile and the power box, and wherein each LED board has a plurality of magnets to couple the structural support to the LED boards of the LED tile.

14. The waterproof LED assembly of claim 1, wherein each LED board includes a plurality of driver chips, wherein each driver chip is configured to received a driving signal from the power box and to drive corresponding LEDs of the waterproof LED assembly in response to the driving signal.

15. A waterproof LED panel comprising a plurality of waterproof LED assemblies of claim 1 mounted on a LED panel frame.

16. The waterproof LED panel of claim 15, wherein the LED panel frame defines a plurality of windows, each window receives one or more plates, and each of the one or more plates has one or more amongst the plurality of waterproof LED assemblies affixed thereto.

17. The waterproof LED panel of claim 15, wherein each of the one or more plates has a plurality of openings, each water proof connector assembly extends through one of the plurality of openings on the plate.

18. A method for constructing the waterproof LED panel of claim 15, comprising:

constructing a LED panel frame having a plurality of windows, mounting one or more plates in each of the plurality of windows; and mounting one or more of the waterproof LED assemblies on each of the one or more plates.

19. The method of claim 18, further comprising: connecting the power box in each of the waterproof LED assembly with an external power source and an external signal source.

* * * * *